United States Patent
O'Mahony (10) Patent No.: US 6,457,129 B2
(45) Date of Patent: *Sep. 24, 2002

(54) GEOGRAPHIC LOCATION RECEIVER BASED COMPUTER SYSTEM SECURITY

(75) Inventor: Barry A. O'Mahony, Banks, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,992

(22) Filed: Mar. 31, 1998

(51) Int. Cl.$^7$ .............................. G06F 11/30; H04L 9/00
(52) U.S. Cl. ...................................... 713/200; 713/201
(58) Field of Search ................................ 713/200, 201, 713/202

(56) References Cited

U.S. PATENT DOCUMENTS

| | | | |
|---|---|---|---|
| 4,873,513 A | * 10/1989 | Soults et al. | 345/27 |
| 5,532,690 A | * 7/1996 | Hertel | 340/989 |
| 5,751,245 A | * 5/1998 | Janky et al. | 342/357.07 |
| 5,751,246 A | * 5/1998 | Hertel | 342/357.07 |
| 5,825,283 A | * 10/1998 | Camhi | 340/438 |
| 5,870,029 A | * 2/1999 | Otto et al. | 340/825.36 |
| 5,878,223 A | 3/1999 | Becker et al. | |
| 5,887,140 A | 3/1999 | Itsumi et al. | |
| 5,887,269 A | * 3/1999 | Brunts et al. | 701/208 |
| 5,892,454 A | * 4/1999 | Schipper et al. | 340/825.37 |
| 5,918,222 A | 6/1999 | Fukui et al. | |
| 5,922,073 A | * 7/1999 | Shimada | 713/200 |
| 5,927,240 A | * 7/1999 | Maxon | 123/179.3 |

OTHER PUBLICATIONS

"BART The Ultimate Cellular Security for Your Car; Two proven technologies combined for unmatched car security . . . ", Last modified: Apr. 21, 1997, 2 pgs., downloaded from Website http://www.bartgps.com/moreinfo.htm.

™ Vehicle Security & Tracking Systems; Satellarm Ltd, 26 Chapel Lane, Thurlby Lincs PE10 0EW 01778 426060, 4 pgs., downloaded from http://www.stamford.co/uk/satellarm/.

Peter Wayner, "Technology That Tracks Cell Phones Draws Fire", CyberTimes, The New York Times on the Web, Feb. 23, 1998, 4 pgs., downloaded http://search.nytimes.com/search/daily/bin/fastweb.

Peter Wayner, "Technology That Tracks Cell Phones Draws Fire", pp. 1–3, Feb. 23, 1998, found at http://nytimes.com/search/abstract.

* cited by examiner

Primary Examiner—Dieu-Minh Le
(74) Attorney, Agent, or Firm—Blakely, Sokoloff, Taylor & Zafman LLP (57) ABSTRACT

A method and apparatus using a location receiver for computer security is provided. A system includes a processor and a bus coupled to the processor. The system further includes a location receiver for receiving a current location of the system, and a database including at least one authorized location for the system. The system further includes a comparator for comparing the current location with the authorized location. The system also includes a response unit for responding if the current location does not correspond to the authorized location.

28 Claims, 6 Drawing Sheets

GEOGRAPHIC LOCATION RECEIVER BASED COMPUTER SYSTEM SECURITY

FIELD OF THE INVENTION

The present invention relates to computer security, and more specifically, to using a geographic location for computer security.

BACKGROUND

Local identification systems provide a geographic location for a location identification system. One known location identification system is a the global positioning system.

The Global Positioning System (GPS) is a "constellation" of 24 satellites that orbit the Earth and make it possible for people with ground receivers to pinpoint their geographic location. The location accuracy is anywhere from 100 to 10 meters for most equipment. Accuracy can be pinpointed to within one meter with special military-approved equipment or by using differential GPS. Differential GPS uses a fixed location receiver in addition to a GPS satellite, to determine the exact location of the receiver.

GPS equipment is widely used in science and has now become sufficiently low-cost so that almost anyone can own a GPS receiver. The GPS is owned and operated by the U.S. Department of Defense but is available for general use around the world. The system encompasses twenty-one GPS satellites and three spare satellites in orbit at 10,600 miles above the Earth. The satellites are spaced so that from any point on Earth, four satellites will be above the horizon. Each satellite contains a computer, an atomic clock, and a radio. With an understanding of its own orbit and the clock, it continually broadcasts its changing position and time. On the-ground, any GPS receiver contains a computer that "triangulates" its own position by getting bearings from three of the four satellites.

The result is provided in the form of a geographic position—longitude and latitude. If the receiver is also equipped with a display screen that shows a map, the position can be shown on the map. If a fourth satellite can be received, the receiver/computer can figure out the altitude as well as the geographic position. If the receiver is moving, the receiver may also be able to calculate its speed and direction of travel and provide an estimated time of arrival to a specified destination.

GPS receivers are becoming consumer products. In addition to their outdoor use (hiking, cross-country skiing, ballooning, flying, and sailing), one prior art use of GPS receivers is in cars to relate the driver's location with traffic and weather information.

Figure 1:
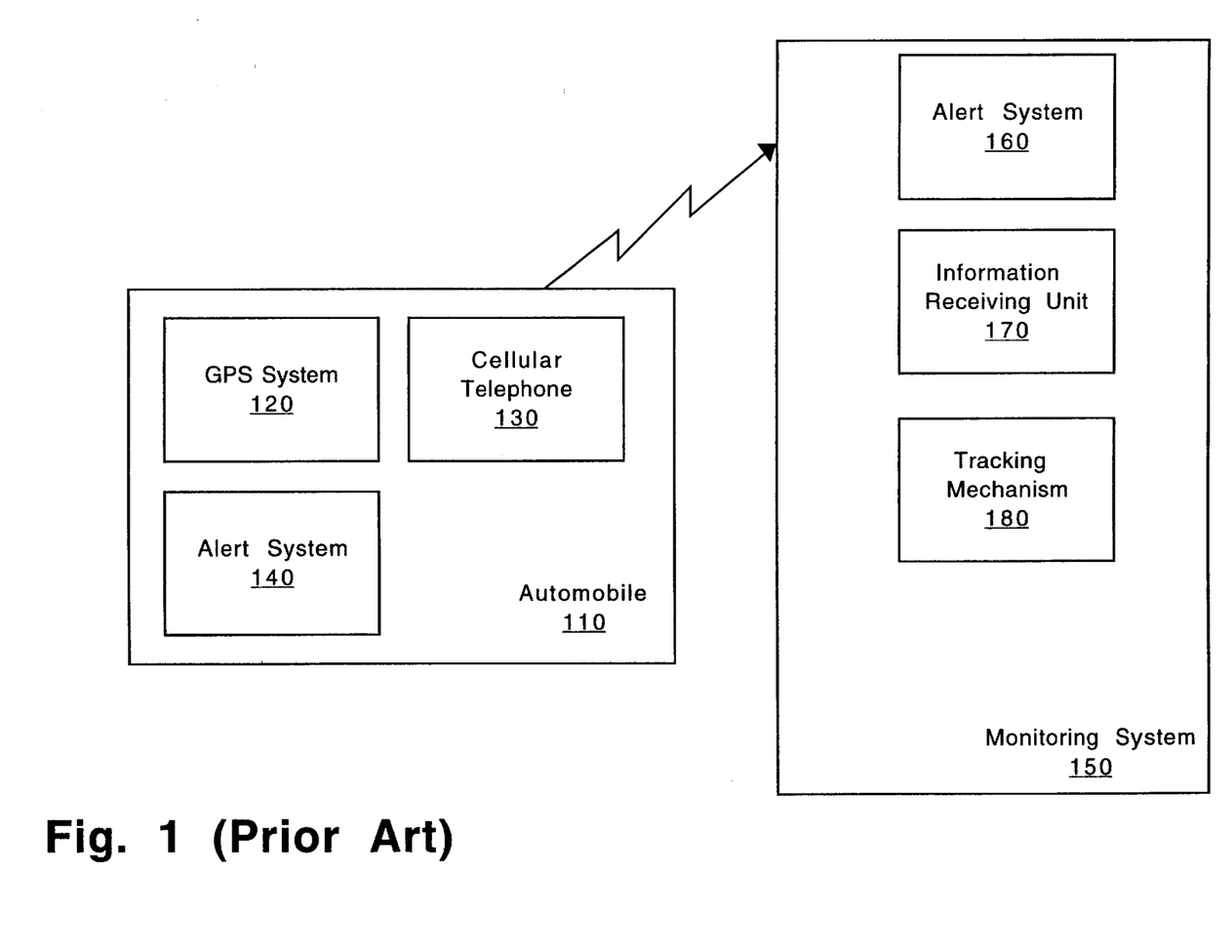
FIG. 1 illustrates a prior art security system for an automobile.

FIG. 1 illustrates a prior art security system for vehicles. A GPS system 120 and a cellular telephone 130 are in the vehicle 110. When a vehicle 110 including the GPS system 120 and cellular telephone 130 is stolen, the user notifies a monitoring station which includes a monitoring system 150. The monitoring system 150 includes an alert system 160, an information receiving unit 170 for receiving GPS information transmitted by the vehicle 110, and a tracking mechanism 180 that includes a GPS receiver. When the user alerts the monitoring system 150, the information receiving unit 170 the dials into the cellular telephone 130 in the stolen vehicle 110. The GPS system 120 on the stolen vehicle 110 transmits details of the vehicle's 110 location via the cellular telephone 130. These longitude and latitude details are displayed on the tracking mechanism 180 of the monitoring system 150. this permits the monitoring system 150 to direct the police to recover the vehicle.

SUMMARY OF THE INVENTION

A method and apparatus for a location based security system is described. The system includes a processor and a bus coupled to the processor. The system further includes a location receiver for receiving a current location of the system, and a database including at least one authorized location for the system. The system further includes a comparator for comparing the current location with the authorized location. The system also includes a response unit for responding if the current location does not correspond to the authorized location.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a computer security system is described.

Figure 2:
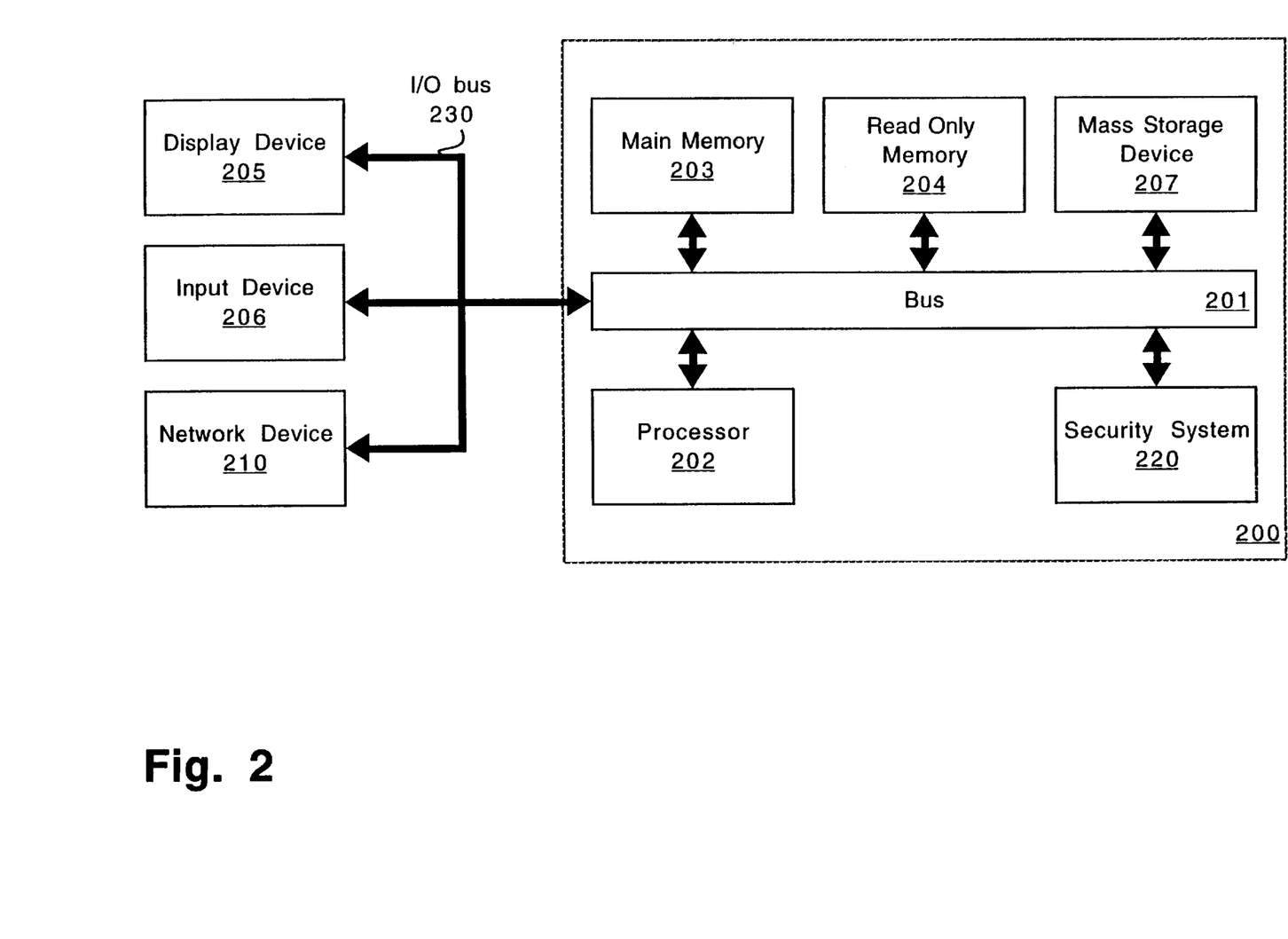
FIG. 2 illustrates a computer system on which the present invention may be implemented.

FIG. 2 is a block diagram of the computer system 200 in which an embodiment of the present invention can be implemented. Computer system 200 comprises a bus 201 or other communication means for communicating information, and a processor 202 coupled with bus 201 for processing information. Computer system 200 also comprises a read only memory (ROM) and/or other static storage device 206 coupled to bus 201 for storing static information and instructions for processor 202.

The computer system 200 further comprises a main memory 203, a dynamic storage device for storing information and instructions to be executed. Main memory 203 also may be used for storing temporary variables or other intermediate information during execution of instructions. In one embodiment the main memory 203 is dynamic random access memory (DRAM).

Computer system 200 can also be coupled via I/O bus 230 to a display device 205, such as a cathode ray tube (CRT) or liquid crystal display (LCD) screen, for displaying information to a computer user. An input device 206 is typically coupled to I/O bus 230 for communicating information and command selections to processor 202. Another type of user input device 206 is cursor control device 206, such as a mouse, a trackball, trackpad, or cursor direction keys for communicating direction information and command selections to processor 202 and for controlling cursor movement on display device 205. Alternatively, other input devices 206 such as a stylus or pen can be used to interact with the display.

The computer system 200 may further be coupled via the I/O bus 230 to a network device 210 for communicating with other computers. The network device 210 may be a modem, a network card, or other device to communicate between the computer system 200 and other systems or networks.

The computer system 200 further includes a security system 220 for determining the geographic location of the computer system 200. For one embodiment, the security system 220 is coupled to the computer system 200 via the main bus 201. For another embodiment, the security system 220 is coupled to the computer system 200 via the I/O bus 230 or the PCI bus. Alternatively, the security system 220 may be included in the processor 202.

Figure 3:
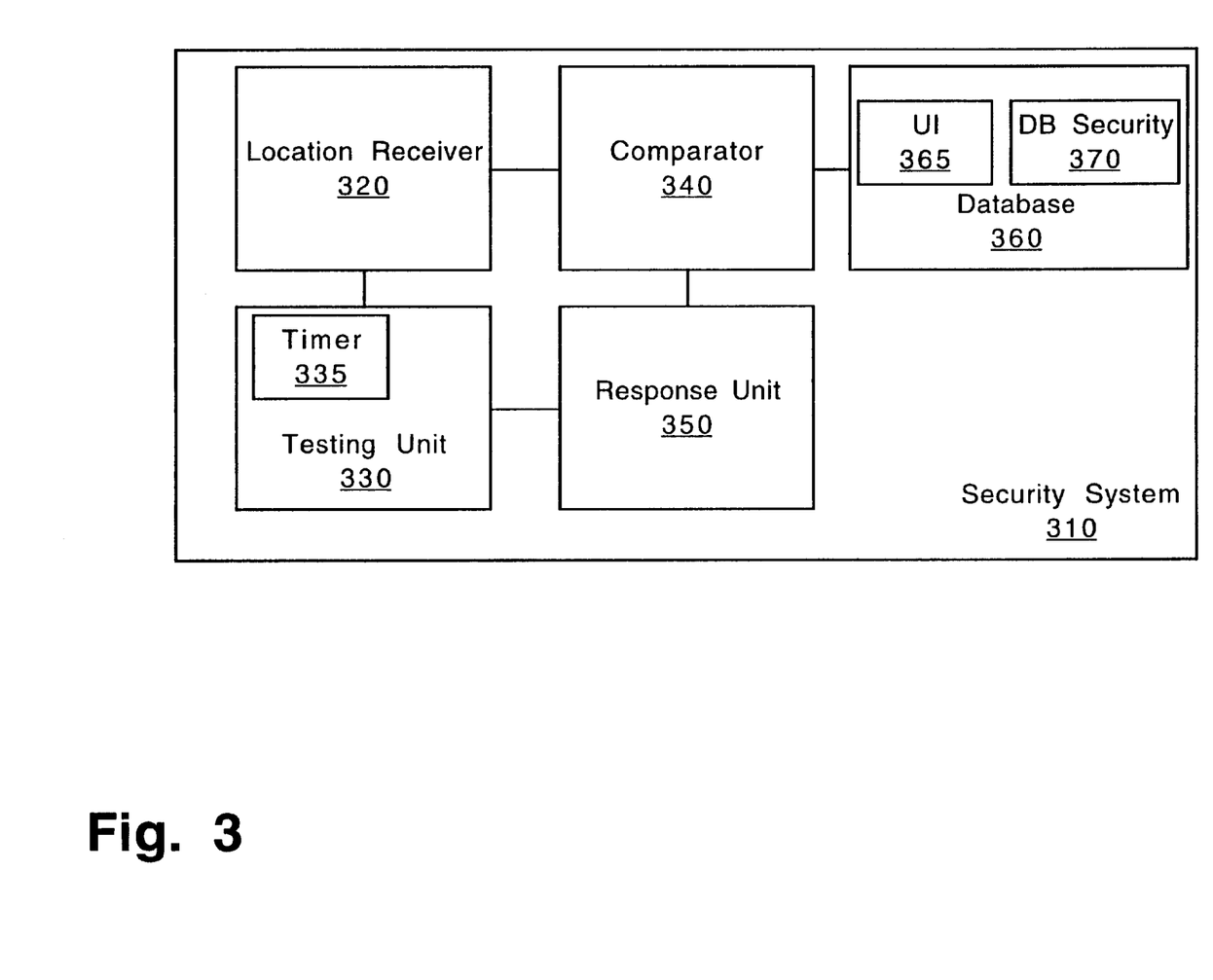
FIG. 3 illustrates a block diagram of one embodiment of the security system of the present invention.

FIG. 3 illustrates a block diagram of one embodiment of the security system of the present invention. The security system 310 includes a location receiver 320. For one embodiment, the location receiver is a global positioning system (GPS) receiver 320. For another embodiment, the location receiver may be based on cellular telephone cell locations. Alternative systems that determine a current location may also be used.

The security system 310 further includes a database 360. The database 360 stores authorized locations for the system. For one embodiment, the database 360 includes a user interface 365 that permits a user to modify the list of authorized locations. Furthermore, the database 360 includes a database security unit 370 that restricts access to modifying the database 360, as will be described below. For one embodiment, the database 360 is located on a flash memory device, and the user interface 365 is a flash memory user interface 365.

A testing unit 330 initiates location receiver 320 to test the current location. The testing unit 330 is initialized by a timer 335. The timer 335 may include multiple functions. For one embodiment, the timer 335 simply tests the time expired since the location was last determined. For an alternative embodiment, the timer 335 tests whether the computer has been off since the last time the location was tested. For yet another embodiment, the timer 335 tests whether the computer has been in the standby state since the last time the location was tested. Alternatively, a combination of the above testing conditions, or other conditions, may be used to indicate that a new test is appropriate.

A comparator 340 is further included. The comparator 340 receives the current location information from the location receiver 320, and compares the current location to a list of authorized locations in the database 360. The comparator transmits a yes/no response, indicating whether or not the current location is an authorized location to the response unit 350.

The response unit 350 responds to an affirmative answer by resetting the timer 335. The response unit 350 responds to a negative answer by one of a variety of possible responses. These responses are described in more detail with respect to FIG. 5 below.

The security system of the present invention is different from prior art security systems in that it is self-contained. The database included in the security system and the location receiver 320 together act as a complete system. Prior art systems generally require outside participation. The automobile security system described above requires a user to alert a monitoring station, which then can receive location data from the vehicle. The vehicle itself does not respond to the theft. Additionally, the prior art response is merely permitting monitoring of the location of the vehicle, rather than an affirmative response, as in the present system.

Figure 4:
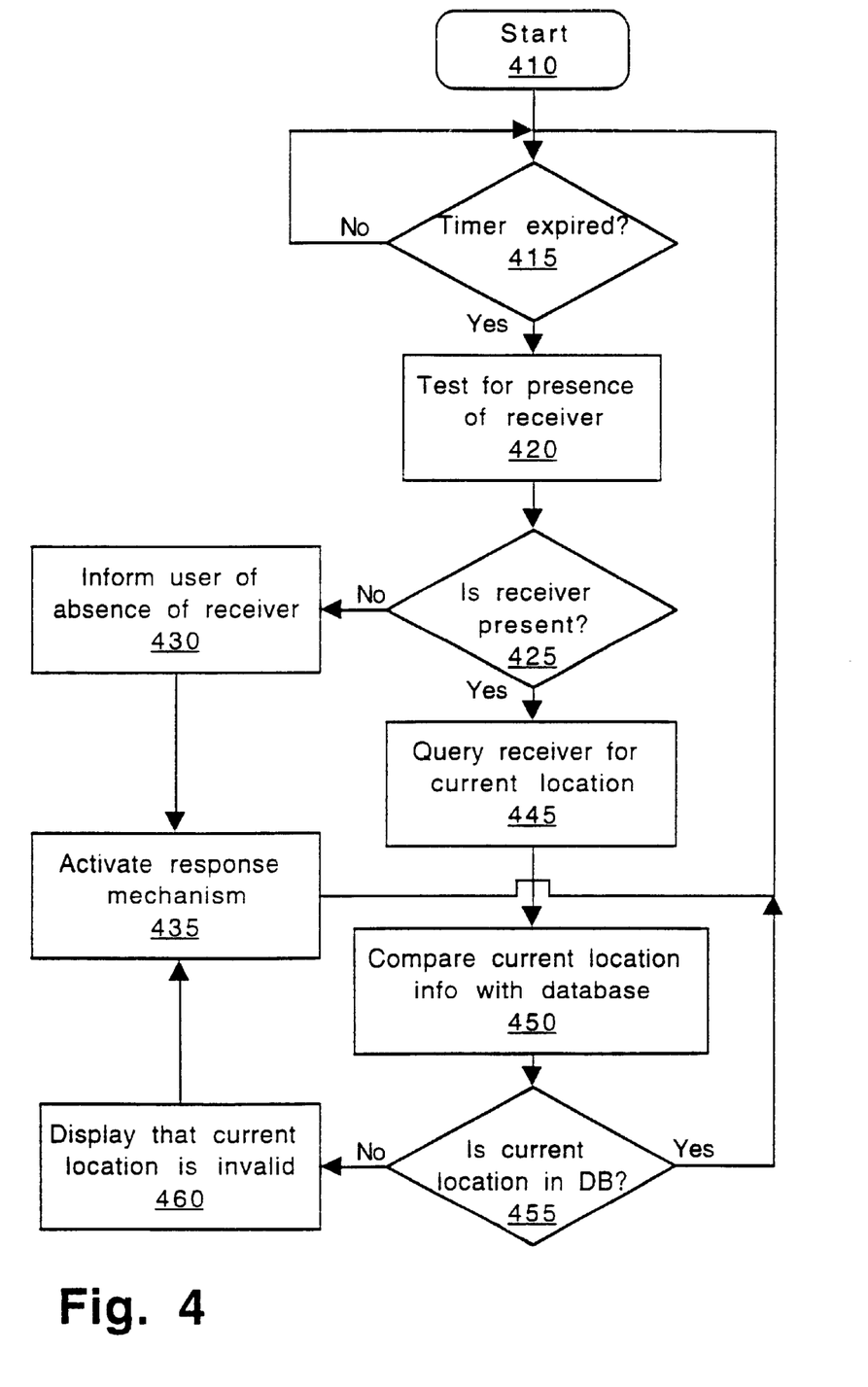
FIG. 4 is a flowchart illustrating one embodiment of the process of location verification.

FIG. 4 is a flowchart illustrating one embodiment of the process of location verification. At block 410 the process starts. At block 415, the process tests whether timer 335 has expired. The timer may have expired because a certain period of time has expired or another event occurred. If the timer is not expired, the process loops back to block 415, to query again. For one embodiment, this system is an interrupt driven system. The process does not continuously query the timer, rather when the timer expires, the timer sends an interrupt to the processor to initiate the process illustrated in FIG. 4. For one embodiment, the entire process runs in the background, without alerting the user. If, at block 415, the timer has expired, the process continues to block 420.

At block 420, the system tests that the location receiver is present in the system. At block 425, the system queries whether the location receiver was found in the system. If the location receiver was found, the process continues to block 445.

At block 445, the location receiver is queried for the current location of the computer system. For one embodiment, the location receiver is a GPS receiver, and the GPS receiver determines a current latitude and longitude, and possibly altitude.

At block 450, the current location, as determined by the location receiver, is compared with location information in the database. At block 455, the process tests whether the current location corresponds to an "authorized location" within the database. As will be discussed below, the locations within the database identify those areas to which the computer system may be moved.

If at block 455, it is determined that the current location is in the database, the process returns to block 415, waiting for timer to expired.

If, however, at block 455, it is determined that the current location is not in the database, the process continues to block 460.

At block 460, for one embodiment, a dialog is displayed indicating that the computer is outside of the area for which its use is authorized. For an alternative embodiment, no such dialog is displayed. The process then continues to block 435.

At block 435, the response mechanism is activated. The response mechanism responds to the computer system being outside of the authorized locations. The specific responses may be any of a range of responses, including turning off the computer, deleting files, etc. The responses will be described in more detail below. After the response mechanism is activated, at block 435, the process returns to block 415, waiting for the timer to expire.

At block 425, the system determined whether the location receiver was present in the system. If no receiver is found, the process continues to block 430. At block 430, the user is informed of the absence of the receiver, for one embodiment. For an alternative embodiment, no such notification is provided. The process then continues to block 435, where the response mechanism is activated. From there, the process returns to block 415, to wait for the timer to expire again.

Figure 5:
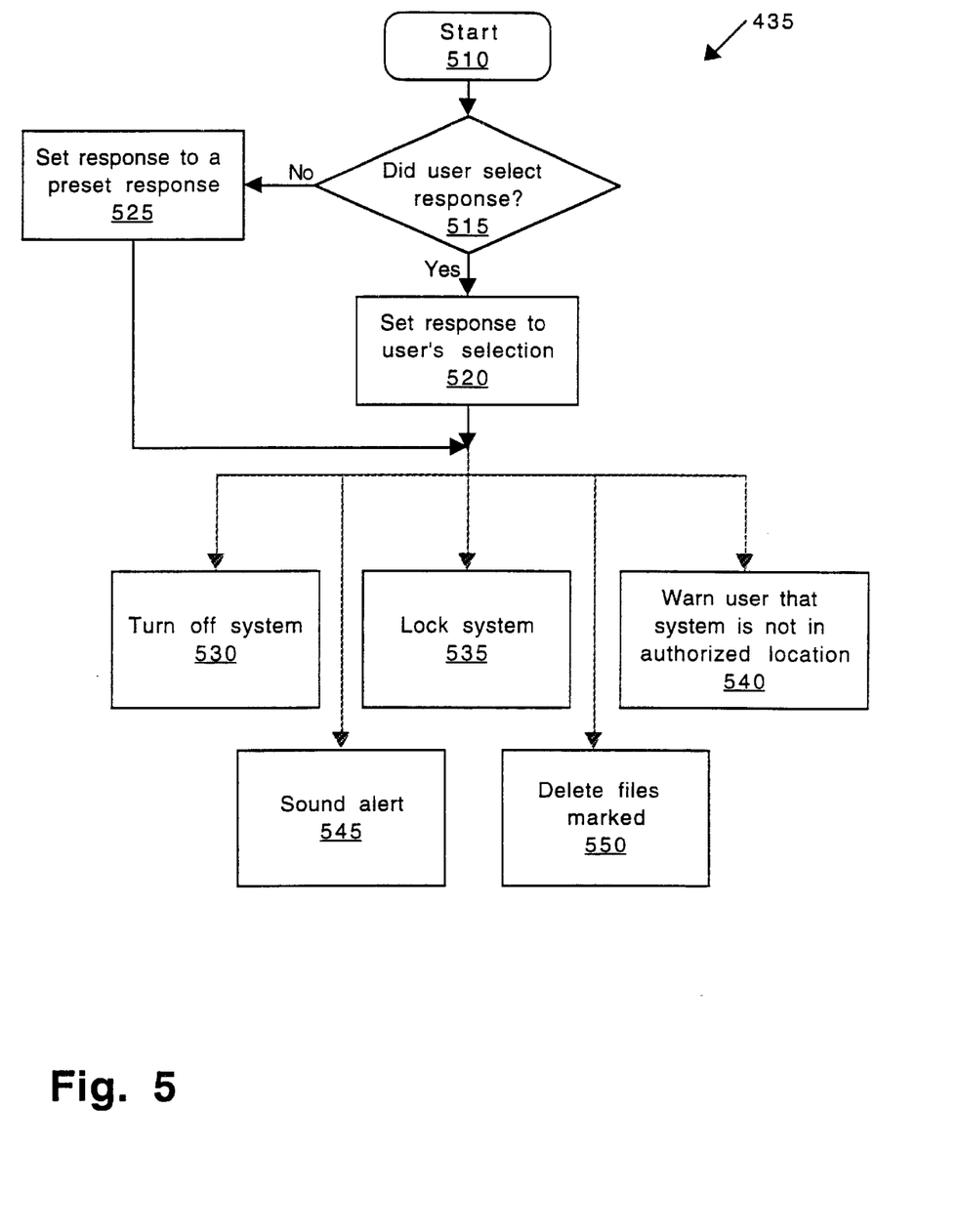
FIG. 5 is a flowchart illustrating one embodiment of the selection of the response.

FIG. 5 is a flowchart illustrating one embodiment of the selection of the response. This flowchart is initiated when the response mechanism is activated, in block 435 of FIG. 4. Returning to FIG. 5, the process starts at block 510.

At block 515, the system tests whether the user has selected a response mechanism. The user may select one of a set of responses to the failure of the location testing. This selection mechanism is protected via known security techniques. For one embodiment, the user has to enter a password, in order to select a response. For one embodiment, after a set number of attempts, the preset mechanism is locked, preventing a thief from breaking into the preset mechanism. Alternative protection for the selection mechanism may be used. For an alternative embodiment, the preset response may not be modified by the user. If the user did not select a response, the system proceeds to block 525. At block 525, the response is set to a default response. If the user selected a response, the system proceeds to block 520. At block 520, the response is set to the user's selected response. The chart then illustrates some of the possible routes. The system may implement any or all of the responses illustrated.

At block 530, the system is turned off. The system may turn off and set the timer such that next time the system is turned on, it tests the location prior to doing anything else. For one embodiment, only part of the system is turned off, such as the input devices.

At block 535, the system is locked. Locking the system prevents access to the system, without turning off the system. This may be useful, for example, if the system were simultaneously sounding an alert, for which the system needs to be turned on. For one embodiment, the system is automatically unlocked when the computer is returned to the designated area. For an another embodiment, the system can only be unlocked by using a special unlocking device such as a key, card, password, or similar system. For one embodiment, the user does not own this special unlocking device. Rather, for example, the system administrator may hold the unlocking device.

At block 540, the user is warned that the system is not in an authorized location. This may include an audio as well as a visual warning. For one embodiment, the "authorized location" is indicated to the user. Thus, for example, the warning may read "This computer system is only authorized to be used within location X."

At block 545, an alert is sounded. Two types of alerts may be sounded. One may be an audible alert similar to a car alarm, indicating to surrounding persons that the system was stolen. In addition, or alternatively, a silent alarm may be transmitted to a predetermined site. For one embodiment, the system may include a cellular telephone or a similar means of communicating with the outside world. In that instance, a telephone alert number may be included within the system to alert the user, the owner of the system, the police, the manufacturer, or another number that the system has been taken outside the authorized area. For an alternative embodiment, if wireless modem is included in the system, the alert may be via e-mail, or other means.

At block 550, the system deletes sensitive files marked for deletion in the event the system is removed from the authorized area. For one embodiment, the system on which this security system is implemented may include highly sensitive files. These sensitive files may be marked for automatic deletion if the system is taken out of the designated geographic area. For one embodiment, the deletion permits recovery, once the system is returned to the appropriate location. For another embodiment, such a deletion is permanent.

Any one or combination of the responses listed in blocks 530–550 may be implemented in the present system. Alternative mechanisms may be used to protect the system from removal from a designated geographic location.

Figure 6:
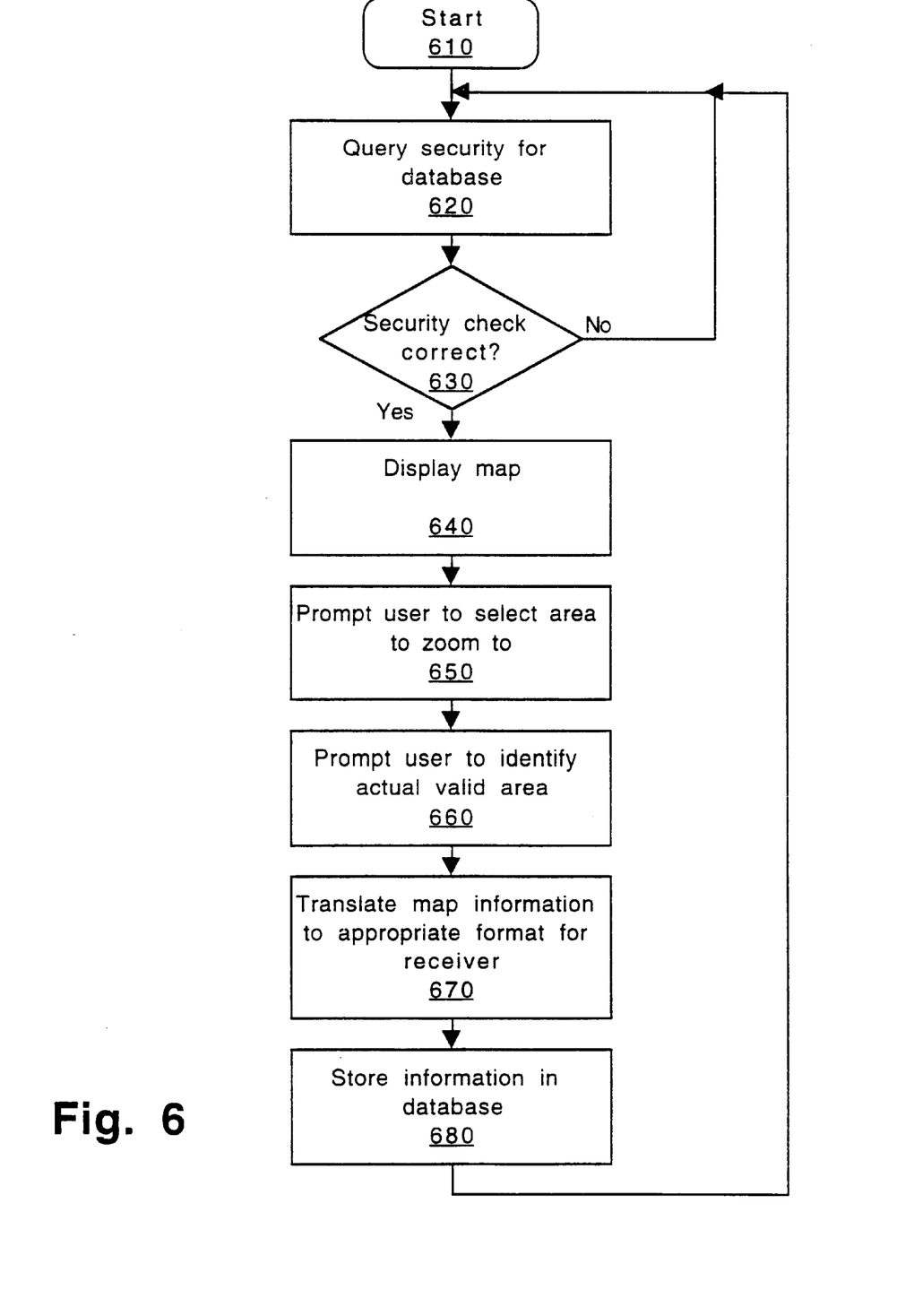
FIG. 6 is a flowchart illustrating one embodiment of the process of adding authorized locations to the present system.

FIG. 6 is a flowchart illustrating one embodiment of the process of adding authorized locations to the present system. The system includes a database of authorized locations. These locations may be as narrow as a particular building, or as broad as all of the United States. For one embodiment, the location is defined by a latitude and longitude information. At block 610, the process starts.

At block 620, security is queried for the database. Adding authorized locations to the database is restricted. Otherwise, a thief could simply access the database and add the whole world as authorized area. For one embodiment, the security is a password. For one embodiment, the security is encrypted by a public key of the user, requiring the user's private key to decrypt. For one embodiment, the security includes a hardware device, such as a flash memory device, making it harder to break. Other means of ensuring that only those authorized to alter the database are permitted to access it may be used. For one embodiment, the security check includes testing whether the computer is in an authorized location at the time of access. If the computer is not in an authorized location, the security check fails.

At block 630, the system tests whether the security check is correct. That is, the system tests whether the user attempting to access the database is authorized to do so. If the security check fails, the system returns to block 620. If the security check is correct, the system continues to block 640.

At block 640, for one embodiment a map is displayed. For one embodiment, this map is of the United States. For another embodiment, this is a map of the world. For a third embodiment, the user can select the map area to be displayed from a menu or via user entry.

At block 650, for one embodiment the user is prompted to select an area of the map. This step may be repeated until the map is of sufficient detail to permit the user to select the actual location or locations for authorization.

At block 660, the user is prompted to identify actual valid area. For one embodiment, this is done by marking an area within the displayed map. For an alternative embodiment, the steps illustrated in blocks 640 and 650 may be left out, leading the user directly to block 660. In one embodiment, after block 630, the user can directly enter latitude and longitude information. For yet another embodiment, the user may add names of designated areas, such as cities, counties, countries, etc. Alternative methods of adding information about a geographic location may be used.

At block 670, the map information is translated into the appropriate information for the location receiver. For one embodiment, the location receiver is a GPS system, and the appropriate format is latitude and longitude information. For another embodiment, a different system may be used. For one embodiment this step may be skipped, and the information about the current location may be translated during the testing process illustrated in FIG. 4.

At block 680, the information is stored in the database. The system then returns to block 610, the starting position. The user may continue adding locations, or in the alternative, end the location addition. For one embodiment, the location addition mechanism is automatically terminated after a certain number of idle minutes.

The security system 310 may be implemented in a wide variety of systems. For example, the security system 310 may be included in a portable computer. For another embodiment the system 310 may be included in systems that have an authorized area of use, such as rental cars/vans. For example, some rental car companies prohibit removing the vehicle from the state or country. This could be monitored using the security system. Other transportable goods which may have an authorized set of locations, for example freight being transported, may also include the security system 310. This may prevent theft of such goods. For one embodiment, the security system 310 may be implemented on the primary chip or motherboard.

For yet another embodiment, the security system 310 may be included in expensive stereos, video camcorders, high end audio equipment, military systems, defense/military items, kiosks, multimedia systems, mainframes, PBX systems, server systems, routers & hubs, super computers, etc. The security system 310 may further be included in any organizer that includes sensitive information. Additionally, the system 310 may be incorporated into sensitive equipment—f.e. systems under development. Other uses for the security system may be found as well.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system coupled to a device, the system comprising:
    a location receiver to receive a current location of the system;
    a memory to include at least one authorized location for the system;
    a comparator to compare the current location with the authorized location; and
    a response unit to be programmed by a user of the system with one or more responses, the response unit to perform substantially automatically at least one of the responses if the current location does not correspond to the authorized location.

2. The system of claim 1, wherein the programmed response comprises disabling the device to which the system is coupled if the current location does not correspond to the authorized location.

3. The system of claim 1, wherein the programmed response comprises sending a warning to a user.

4. The system of claim 1, wherein the programmed response comprises alerting authorities if the current location does not correspond to the authorized location.

5. The system of claim 1, wherein the programmed response comprises deleting files from the system to prevent access to the files.

6. The system of claim 1, wherein the programmed response comprises, for a device which is a computer system, locking the computer system until the current location corresponds to the authorized location.

7. The system of claim 1, further comprising a timer to trigger a comparison by the comparator of the current location and the authorized location on a periodic basis.

8. The system of claim 1, wherein the location receiver comprises a global positioning system (GPS) receiver.

9. The system of claim 1, further comprising: a user interface to add and delete authorized locations in the memory.

10. The system of claim 9, wherein access to the user interface is protected by a security mechanism.

11. The system of claim 10, wherein the security mechanism is a password system.

12. The system of claim 9, wherein the memory is a flash memory card, and wherein the user interface is a flash memory user interface.

13. The system of claim 9, wherein the user interface further comprises:
    a map display mechanism to display a map; and
    a selection mechanism to select an area within the map as an authorized location.

14. The system of claim 13, further comprising a translation mechanism to translate the area to geographic coordinates for the location receiver.

15. The system of claim 1, further comprising a default response.

16. The system of claim 1, wherein the device comprises a computer system, and a processor of the computer system is used as the comparator.

17. A method of security for an item including a processor, a memory, and a security mechanism, the method comprising:
    allowing a user to program at least one response into the security mechanism;
    periodically receiving current location information corresponding to a current geographic coordinates of the item from a location receiving unit;
    comparing the current location of the item with one or more authorized locations in the memory; and
    performing substantially automatically at least one of the responses if the current location of the item does not correspond to one of the one or more authorized locations.

18. The method of claim 17, wherein the programmed response comprises one of the following: disabling the item, sending a warning to a user, alerting authorities, files, and locking the item.

19. The method of claim 18, further comprising the step of preventing the item from being enabled until the current location corresponds to an authorized location.

20. The method of claim 17, wherein said authorized location may be a plurality of authorized locations, and comparing the current location comprises comparing each of the plurality of authorized locations with the current location.

21. The method of claim 17, further comprising:
    receiving a request to change the database of authorized locations;
    verifying an authorization to change the database of authorized locations; and
    if an authorization is received, enabling a user to add and delete the authorized locations.

22. The method of claim 21, wherein enabling a user to add additional authorized locations comprises:
    displaying a map;
    prompting the user to select a new authorized location on the map.

23. The method of claim 22, further comprising translating the new authorized location into a set of location coordinates.

24. The method of claim 22, wherein displaying a map comprises displaying a plurality of increasingly detailed maps based on the user's selections.

25. A computer system including a security mechanism for the computer system, the computer system comprising:
    a processor;
    a bus;
    a memory coupled to the processor and the bus; and
    a security mechanism comprising:
        the memory to include at least one authorized location for the system;
        a location receiver to receive a current location of the system;
        the processor to compare the current location with the authorized location; and a response unit to be programmed by a user of the computer system with one or more responses, the response unit to perform substantially automatically at least one of the responses if the current location does not correspond to the authorized location.

26. The system of claim 25, wherein the response unit is further to disable the processor if the current location does not correspond to the authorized location.

27. The system of claim 25, wherein the response comprises one of the following: disabling the computer system, sending a warning to a user, alerting authorities, deleting files from the computer system, limiting access to the computer system, and locking the computer system until the current location corresponds to the authorized location.

28. The system of claim 27, wherein alerting authorities comprises sending an electronic message to a designated authority, when the computer system is coupled to a network.

* * * * *